United States Patent [19]

Jones

[11] Patent Number: 5,689,302

[45] Date of Patent: Nov. 18, 1997

[54] HIGHER DEFINITION VIDEO SIGNALS FROM LOWER DEFINITION SOURCES

[75] Inventor: Arthur Howard Jones, Horsham, United Kingdom

[73] Assignee: British Broadcasting Corp., London, England

[21] Appl. No.: 721,755

[22] Filed: Sep. 30, 1996

Related U.S. Application Data

[63] Continuation of Ser. No. 446,787, filed as PCT/GB93/02383, Nov. 19, 1993.

[51] Int. Cl.$^6$ ............................................. H04N 5/225
[52] U.S. Cl. ...................... 348/218; 348/36; 348/716; 348/441
[58] Field of Search ............................ 348/714–716, 348/36–39, 218, 383, 441, 700, 699, 135, 143, 153, 159, 452; H04N 7/01, 5/225

[56] References Cited

U.S. PATENT DOCUMENTS

| | | | |
|---|---|---|---|
| 4,393,410 | 7/1983 | Ridge et al. | |
| 4,797,942 | 1/1989 | Burt | 348/218 |
| 4,862,267 | 8/1989 | Gillard et al. | 358/140 |
| 4,947,257 | 8/1990 | Fernandez et al. | 348/715 |
| 5,016,109 | 5/1991 | Gaylord | |
| 5,045,939 | 9/1991 | Okayama et al. | 348/700 |
| 5,159,458 | 10/1992 | Cox et al. | 348/218 |
| 5,227,888 | 7/1993 | Haga | |
| 5,272,530 | 12/1993 | Cassereau | 348/700 |
| 5,274,453 | 12/1993 | Maeda | 348/700 |
| 5,339,104 | 8/1994 | Hong | 348/700 |
| 5,412,422 | 5/1995 | Yamada et al. | 348/218 |

FOREIGN PATENT DOCUMENTS

| | | |
|---|---|---|
| 3 240 372 | 10/1991 | Japan . |
| 2 117 209 A | 10/1983 | United Kingdom . |
| 2 175 768 A | 12/1986 | United Kingdom . |
| 2 245 795 A | 1/1992 | United Kingdom . |
| 2 249 906 A | 5/1992 | United Kingdom . |
| 2 251 354 A | 7/1992 | United Kingdom . |
| WO 8 705 770 | 9/1987 | WIPO . |
| WO 9 002 466 | 3/1990 | WIPO . |
| WO 9 114 338 | 9/1991 | WIPO . |

Primary Examiner—Victor R. Kostak
Attorney, Agent, or Firm—George Neuner; Milton Oliver

[57] ABSTRACT

A conventional definition camera acquires video data relating to a portion of an image to be televised and stores the data in a higher definition capacity store. The camera is panned and tilted to acquire data relating to other parts of the image. A motion detector determines the degree of movement of the camera and controls the writing of data to the store. A spatio-temporal interpolator interpolates the video data to correct for spatial or sensitivity incompatibilities. The output from the store may again be spatio-temporally interpolated by an interpolator under control of the motion detector to compensate for movement within the image to be televised. In a further embodiment image data is acquired by a plurality of overlapping lower definition sources.

11 Claims, 3 Drawing Sheets

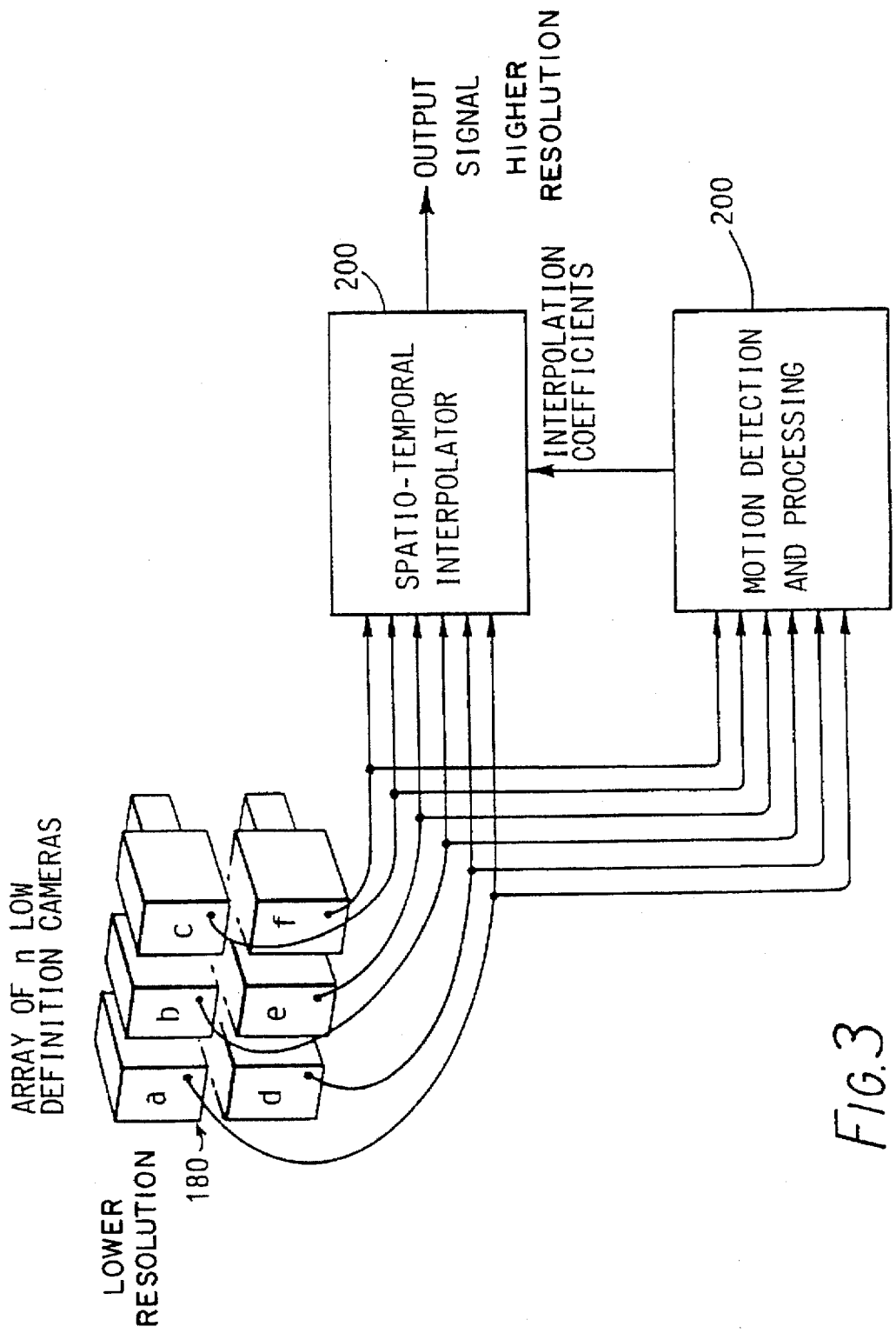

HIGHER DEFINITION VIDEO SIGNALS FROM LOWER DEFINITION SOURCES

This application is a continuation of copending applications(s) Ser. No. 08/446,787 filed on May 31, 1995 namely U.S. phase of International Application PCT/GB93/02383 filed on Nov. 19, 1993 and which designated the U.S.

BACKGROUND OF THE INVENTION

This invention relates to the acquisition of high definition video signals from lower definition input video signals produced either from cameras or other video signal sources.

The invention is defined in the claims to which reference should be made.

SUMMARY OF THE INVENTION

In one preferred embodiment of the invention video data is acquired by a lower definition image To be televised and stored in the higher definition store at appropriate storage locations. The camera is then panned and tilted to acquire video data from remaining portions of the image. The data from the remaining portions is written to the store at locations appropriate to the relative position in the image of the data acquired and the data already written to the store. Movement of the camera is taken into account by deriving motion vectors from the video data.

In another preferred embodiment a plurality of low definition source cameras are used to acquire video data from the first image portion and the further image portions simultaneously. The areas of the image from which a given cameras acquires data partially overlaps the acquisition area of at least one other camera.

BRIEF DESCRIPTION OF THE DRAWINGS

Embodiments of the invention will now be described, by way of example, and with reference to the accompanying drawings, in which:

FIG. 3 is a schematic diagram of an alternative method of signal acquisition embodying the invention.

DETAILED DESCRIPTION OF THE PREFERRED EMBODIMENTS

Figure 1:
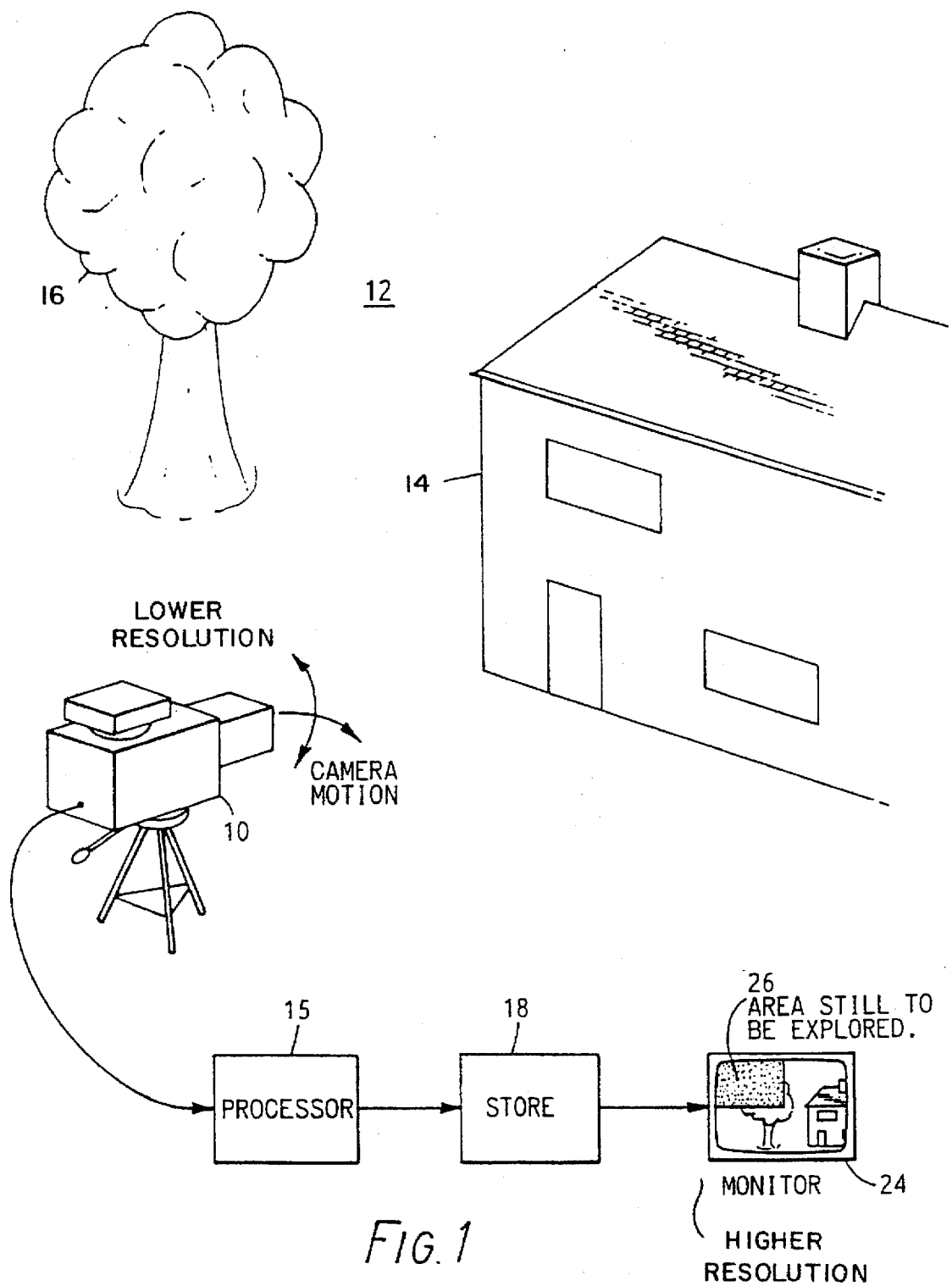
FIG. 1 is a schematic diagram of a basic system embodying the invention.

In the simple embodiment of FIG. 1, a video signal source, here a television camera 10 is directed at a part of a scene or image 12 to be televised. The camera 10 is a lower definition video signal source which is to be used to obtain higher definition video signals. In FIG. 1 the scene comprises house 14 and tree 16. The camera, which may be a conventional definition camera, produces, at any one time, a sub set of the pixels which make up the full high definition television (HDTV) image. This sub set of pixels represents a first portion of the image to be televised and is written into an HDTV picture store 18 at storage locations appropriate to the overall position of the image portion scanned in the picture or image to be televised. The complete set of pixels for the HDTV image is obtained by moving the video source, by panning (movement of the camera in the X axis) and tilting (movement in the Y axis) so that the scene is fully explored. The speed of movement of the camera must be sufficiently slow that sharp images are produced. This is dependent on the exposure time of the camera (some are electronically shuttered) and/or on any correction for lag effects. Movement of the video source acquires data from further image portions. These data are also stored in the higher definition store 18 at locations related to the storage locations of the first image portion in accordance with the relative positions in the image of the first and further image portions.

To ensure that the HDTV image is correctly constructed, the pixels acquired from the panning and tilting of the camera must be entered into appropriate locations in the storage means, HDTV store 18. It is therefore necessary to know the motion of the camera. Although camera motion might be measured by a mechanical or optical device it is preferred to apply measurements directly to the signal produced by the camera using movement information derived from the video signal such as motion vectors. An example of motion vector measurement is described in GB-A-2188510 the disclosure of which is incorporated herein by reference. The technique disclosed therein is used to establish how far the information from sub sets of pixels already entered into the store 18 has moved in relation to the scanning structure. From that calculation the proper location for picture pixels newly generated can be computed. Other known techniques for motion vector measured may be used to perform this operation. Measurement of motion vectors according to the disclosure of GB-A-2188510 can produce a highly accurate result as the technique was developed to establish the relative motion of sub-blocks of a scene and is being used here to establish the global motion experienced at any one time by almost all of a still scene.

In practice, smaller areas of the picture cannot be ignored as even the best lenses cause some geometrical distortion.

Figure 2:
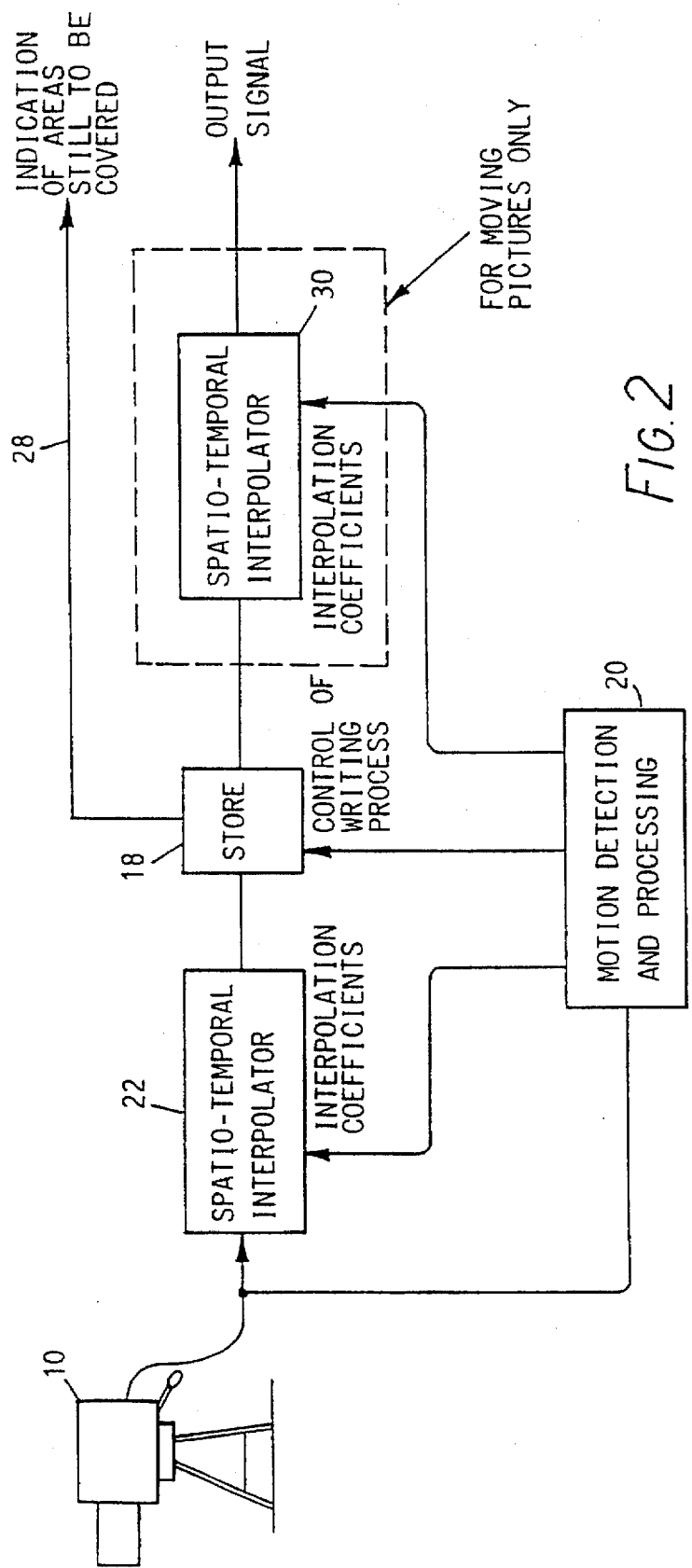
FIG. 2 is a block schematic diagram illustrating refinements to the system of FIG. 1.

To allow for such distortions it is desirable and convenient to commence exploration of the scene with the camera directed to its centre portion. The corresponding video signal derived from that centre portion is entered directly into the corresponding part of store 18. Thereafter, as the camera moves, the derivation of other HDTV picture elements is achieved by spatial interpolation between the pixels produced by the camera under the control of the motion detector. This system is illustrated in FIG. 2 in which the output of the camera 10 is passed to motion detection and processing means 20 and to spatio-temporal interpolator 22. The motion detection and processing means detects the degree of motion of the camera and derives a set of motion vectors from that detected motion. The motion vectors are used to develop a set of interpolation coefficients which are applied as a control to the interpolator 22. The interpolation performed by interpolator 22 is controlled by the coefficients derived by the motion detection and processing means 20. The interpolator 22 corresponds to the processor 15 in FIG. 1. The output of interpolator 22 is written into HDTV store 18, again under control of the motion detector/processor 20. The motion detector and processor 20 can be viewed as a means for controlling the addressing of the higher definition store 18.

The signals produced by the motion detector can also be examined to determine whether, and to what degree, geometrical distortions are magnified as the camera moves from the centre to the edges of the picture. If the distortion is judged to be unacceptable, the picture could be re-interpolated or new interpolation coefficients generated such that interpolation now takes place within the central portion of the image, to correct it.

The interpolation process could also be used to give some flexibility in the relative sizes of the camera and HDTV images. The ability of the interpolator 22 to interpolate temporally arises from the camera pans and tilts, which cause each small area of the scene to be scanned many times appearing in various positions on the photosensitive surface. Temporal and spatial interpolation is therefore possible in the information to be stored in store 18. Temporal interpolation can be used to average out the effects of vignetting and other camera spatial sensitivity variations.

Spatial control of the motion of the camera is not necessary. It is possible to arrange for a display showing the parts of the image which have been covered and thus indicating the directions in which the camera still needs to be pointed to complete the scene. A display 24 is illustrated in FIG. 1 and includes a portion 26 yet to be scanned. The store 18 can be loaded initially with a signal representing black to carify the indication of unscanned areas. In FIG. 2 the signal to be displayed is read out directly from store 18 on line 28. The video data representing scanned image portions overwrites the black signal stored at the corresponding location in store 18.

As an alternative to the black unscanned areas of FIG. 1, the circuits controlling the storage process can be designed to produce on the display a specific delineation of areas still to be covered.

The system as described so far is suitable for still scenes. Moving HDTV pictures may be produced by controlling movement of the video signal source, i.e. panning and tilting of the camera such that each part of the scene is visited in a regular sequence. Such a control may be mechanical. The output of the store 18 can then be interpolated using a further spatio-temporal interpolator 30 (FIG. 2). A similar technique has been proposed to produce smooth slow motion from a sequence of conventional video images. This implementation is limited to situation where objects are moving slowly. If an object moves too quickly whilst out of sight of the camera an effect similar to the well known 'wagon wheel' effect caused by insufficient temporal sampling will occur. This problem may be alleviated by making use of the fact that when objects are within sight of the camera they are scanned temporally at normal television rate. By making more use of the motion vector information generated by motion detector/processor 20 a controlled motion extrapolation can be generated for application when the camera is looking elsewhere.

The basic technique described may be used with other video signal sources such as electronic sources for building up an HDTV graphic using a low definition (conventional) graphics generator.

The system is similar to the camera example except that no interpolation is necessary and only the store writing process needs to be controlled.

FIG. 3 shows an alternative approach to application of the technique described. A number n of low definition cameras 180a . . . f are arranged so that their fields of view overlap and so that, between them, they cover the whole scene. The output of each camera is passed to a spatio-temporal interpolator 220 and a motion detector/processor 200 which generates interpolation coefficients to control the interpolator. Each of the interpolator 220 and the motion detector/ processor 200 comprises an individual circuit for each camera. The motion detectors decide the nature of the overlaps to control the spatial interpolator to generate a complete set of HDTV pixels correcting for spatial or sensitivity incompatibilities. As all of the scene is viewed by the cameras at any one time, an array of camera can-cope with motion in the scene more readily than the single camera example described previously. Thus, video data from the first image portion and the further image portions of the previous example is acquired simultaneously by the n lower definition video sources. A store is still required as the individual cameras produce their outputs in parallel and the store enables the high definition picture elements to be sequenced according to the output standard.

I claim:

1. A method of generating a video signal of a scene at a first, higher, definition from a video source sampling the scene at a second, lower, definition comprising steps of:

acquiring with the source, video data at the second lower definition relating to a first portion of an image of the scene to be televised, storing the acquired video data in a higher definition store at locations appropriate to the position of the first image portion in the image of the scene to be televised, acquiring video data relating to further portions of the image of the scene at the lower definition by moving the video signal source, determining the relative positions in the image of further image portions acquired and acquired video data held in the store by deriving movement information from the video data, storing the further video data in the higher definition store at storage locations related to the storage locations of the video data representing the first image portion in accordance with the relative positions in the image to be televised of the first portion and the further portions, and reading from the store video data representing the image of the scene to be televised at the higher definition.

2. A method according to claim 1, wherein the first image portion includes the center of the image to be televised.

3. A method according to claim 1, wherein the video signal source is a camera.

4. A method according to claim 1, wherein the acquisition of video data relating to the further image portions comprises spatially interpolating video data from the source under the control of the derived movement information.

5. A method according to claim 1, comprising temporally interpolating image data acquired from each image portion prior to storage in the storage means.

6. A method according to claim 1, wherein the movement of the video signal source is controlled to follow a predetermined sequence and the output of the higher definition store is spatially and temporally interpolated under the control of the derived movement information.

7. A method according to claim 1, comprising writing a video signal representing black into each location of the store, whereby the storage of video data relating to image portions overwrites the black signal stored at the respective storage locations, and displaying the contents of the store as image data is acquired.

8. A method according to claim 1, comprising displaying an indication of portions of the image to be acquired from which video data has not been acquired.

9. Apparatus for generating a video signal of a scene at a first, higher, definition from a video signal source sampling the scene at a second, lower, definition comprising:

a video signal source for acquiring video data at the second, lower, definition relating to a portion of an image of the scene to be televised at the higher definition, storage means for storing the acquired video data, means for addressing the storage means to store the video data at storage locations appropriate to the position of the image of the scene in the image to be televised, means for moving the video source to acquire video data from further portions of the image of the scene, means for deriving movement information from the video data, the video data being stored in the storage means under the control of the addressing means and the means for deriving movement information from the video data, and means for reading video data from the storage means at the first, higher definition when the video source has been moved to acquire video data from all portions of the image of the scene.

10. A method of generating a video signal of a scene at a first, higher, definition from a video signal source sampling the scene at a second, lower definition comprising steps of:

acquiring simultaneously video data from a plurality of portions of an image of the scene to be televised with a plurality of lower definition video signal sources, wherein the portion of the image of the scene from which video data is acquired by each source partially overlaps the portion of the image of the scene from which at least one other source acquires data, storing the data acquired by each source at locations in a store appropriate to the position within the image of the scene from which the video data was acquired, and interpolating between the signals acquired by the video signal sources under the control of interpolation coefficients derived from movement signals indicative of movement within the image of the scene.

11. Apparatus for generating a video signal of a scene at a first, higher, definition from a video signal source sampling the scene at a second, lower, definition, comprising:

a plurality of video signal sources, each arranged to acquire data at the second, lower, definition from a respective portion of an image of the scene to be televised, the portions of the image of the scene from which any one of the sources acquires video data partially overlapping the portion of the image of the scene from at which at least one of the remaining sources acquires video data, storage means configured to store the video data acquired by each source at storage locations appropriate to the position within the image of the scene from which the video data was acquired, means for determining movement in the scene to be televised and for producing interpolation coefficients in accordance with the determined movement, and means for interpolating the video data acquired by each of the plurality of sources under the control of the interpolation coefficients to produce the higher definition video signal of the scene.

* * * * *